US009745062B2

(12) United States Patent
Richardson

(10) Patent No.: US 9,745,062 B2
(45) Date of Patent: Aug. 29, 2017

(54) METHODS AND SYSTEMS FOR PROVIDING A SAFETY APPARATUS TO DISTRESSED PERSONS

(71) Applicant: James Sommerfield Richardson, Duluth, GA (US)

(72) Inventor: James Sommerfield Richardson, Duluth, GA (US)

(73) Assignee: James Sommerfield Richardson, Duluth, GA (US)

( * ) Notice: Subject to any disclaimer, the term of this patent is extended or adjusted under 35 U.S.C. 154(b) by 109 days.

(21) Appl. No.: 14/689,323

(22) Filed: Apr. 17, 2015

(65) Prior Publication Data
US 2016/0096622 A1    Apr. 7, 2016

Related U.S. Application Data

(60) Provisional application No. 62/071,880, filed on Oct. 6, 2014.

(51) Int. Cl.
*B64D 1/02*   (2006.01)
*B64C 39/02*  (2006.01)
*G05D 1/00*   (2006.01)

(52) U.S. Cl.
CPC .............. *B64D 1/02* (2013.01); *B64C 39/024* (2013.01); *G05D 1/0011* (2013.01);
(Continued)

(58) Field of Classification Search
USPC .............. 701/2; 244/142, 147, 152, 234, 31, 244/137.4, 33, 137.1; 182/137; 441/80,
(Continued)

(56) References Cited

U.S. PATENT DOCUMENTS 4,017,924 A * 4/1977 Higgs ....................... B63C 7/26
                                                            114/349
4,138,077 A * 2/1979 Okumura ................. B64D 1/22
                                                            182/137
(Continued)

FOREIGN PATENT DOCUMENTS

EP            3038914 A2 *  7/2016  .......... B64C 39/024
WO     WO 2015076886 A2 *  5/2015  .......... B64C 39/024

OTHER PUBLICATIONS

ResQuad: Toward a semi-autonomous wilderness search and rescue unmanned aerial system; M. Talha Agcayazi; Eric Cawi; Arsenie Jurgenson; Parham Ghassemi; Gerald Cook; 2016 International Conference on Unmanned Aircraft Systems (ICUAS) Year: 2016; pp. 898-904, DOI: 10.1109/ICUAS.2016.7502618.*
(Continued)

*Primary Examiner* — Cuong H Nguyen
(74) *Attorney, Agent, or Firm* — Alston & Bird LLP

(57) ABSTRACT

Various embodiments of the present invention comprise systems for providing a lifesaving apparatus to a distressed individual. Such systems may comprise an unmanned aerial vehicle (UAV) configured to selectably support a lifesaving apparatus. The UAV may comprise a release mechanism configured to release the lifesaving apparatus when proximate a distressed person. The system may additionally comprise a control device configured to wirelessly communicate with the UAV such that a user can pilot the UAV from a distance and deliver the lifesaving apparatus to a distressed person. Methods of using the same may comprise piloting the UAV proximate a distressed person, providing a signal to the UAV to release the lifesaving apparatus by operating the release mechanism, and then pulling the lifesaving apparatus and the distressed person to safety via a control line secured to the lifesaving apparatus.

14 Claims, 3 Drawing Sheets

(52) U.S. Cl.
CPC .. *B64C 2201/027* (2013.01); *B64C 2201/127* (2013.01); *B64C 2201/128* (2013.01); *B64C 2201/14* (2013.01)

(58) Field of Classification Search
USPC .......................................................... 441/83
See application file for complete search history.

(56) References Cited

U.S. PATENT DOCUMENTS

| | | | | |
|---|---|---|---|---|
| 5,125,601 | A * | 6/1992 | Monford, Jr. | B64G 1/641 244/173.1 |
| 5,530,445 | A * | 6/1996 | Veazey | B63C 9/00 114/102.3 |
| 7,766,274 | B1 * | 8/2010 | Jameson | B64C 39/024 244/137.1 |
| 8,205,822 | B1 * | 6/2012 | Jameson | B64C 39/024 244/137.4 |
| 8,899,513 | B1 * | 12/2014 | Jameson | B64C 39/024 244/137.4 |
| 8,998,666 | B1 * | 4/2015 | Albright | B63C 9/00 340/539.13 |
| 9,183,560 | B2 * | 11/2015 | Abelow | G06Q 10/067 |
| 9,307,383 | B1 * | 4/2016 | Patrick | H04W 4/22 |
| 9,346,547 | B2 * | 5/2016 | Patrick | B64C 39/024 |
| 2007/0120005 | A1 * | 5/2007 | Olson | F03D 5/00 244/33 |
| 2008/0149775 | A1 * | 6/2008 | Dunker | B64C 39/024 244/147 |
| 2009/0152391 | A1 * | 6/2009 | McWhirk | B64B 1/02 244/30 |
| 2012/0069131 | A1 * | 3/2012 | Abelow | G06Q 10/067 348/14.01 |
| 2015/0104757 | A1 * | 4/2015 | Moncrief | G09B 9/05 434/38 |
| 2015/0158587 | A1 * | 6/2015 | Patrick | B64C 39/024 244/137.4 |
| 2015/0187224 | A1 * | 7/2015 | Moncrief | G09B 9/24 434/30 |
| 2016/0023761 | A1 * | 1/2016 | McNally | B64C 39/024 29/407.01 |
| 2016/0086108 | A1 * | 3/2016 | Abelow | G06Q 10/067 705/7.29 |

OTHER PUBLICATIONS

Cooperation control of three UAV's for aerial rescue and aerial retrieval; Zeynep Cakir; Aydan M. Erkmen; Ilkay Yavrucuk 2009 2nd International Conference on Adaptive Science & Technology (ICAST); Year: 2009; pp. 198-203, DOI: 10.1109/ICASTECH.2009.5409723.*

* cited by examiner

METHODS AND SYSTEMS FOR PROVIDING A SAFETY APPARATUS TO DISTRESSED PERSONS

CROSS-REFERENCE TO RELATED APPLICATIONS

This patent application claims the benefit of Provisional Application Ser. No. 62/071,880, entitled "Best Buoy" filed Oct. 6, 2014, which is incorporated herein by reference in its entirety.

BACKGROUND

Rescue personnel are often required to provide rescue services to retrieve distressed persons from water based hazards. Life guards, fishing vessel personnel, public safety officials (e.g., police officers and fire department personnel), and others must act quickly to rescue distressed persons before they succumb to exhaustion, hypothermia, or other risks associated with water survival. These risks may be amplified further if the distressed individual is unable to swim or tires easily, and thus rescue personnel may risk their own safety in order to rescue those at risk of harm.

Certain environmental conditions may further impede rescue efforts, such as heavy seas, frigid water temperatures, fast moving currents, and other environmental risks. These environmental hazards may increase the risk of harm to both the rescuer and the person in distress. Moreover, in many circumstances a person may be at risk of drowning while professional safety officers are not available to rescue the person in distress. For example, passenger airplane water landings may expose many individuals to a risk of drowning, particularly when the airplane lands in a low-temperature body of water. In many cases these airplanes land in bodies of water far removed from highly populated areas, and consequently ground-based rescue personnel may not arrive at the scene of the crash for an extended period of time after the aircraft enters the body of water. Thus, untrained and potentially injured passengers or crew members may seek to provide aid to others involved in the crash, and thus these individuals may reenter an area of danger after reaching safety.

Accordingly, new methods and systems for providing lifesaving equipment to persons in distress are needed.

BRIEF SUMMARY

Various embodiments are directed to systems for providing lifesaving equipment, such as a float, to a person in distress. The system may comprise an unmanned aerial vehicle (UAV) in wireless communication with a control device, such as a handheld device. The UAV may comprise an equipment engagement mechanism, such as an electronically actuated latch, configured to releasably secure the lifesaving equipment to the UAV; wherein the equipment engagement mechanism is operable between a closed configuration in which the lifesaving equipment is secured to the UAV and an open configuration in which the lifesaving equipment is released from the UAV. In various embodiments, the control device may be configured to generate one or more directional signals in response to user input indicating a desired direction for the UAV, wherein the directional signals are indicative of a desired direction of travel for the UAV; generate a release signal in response to user input indicating a request to release the lifesaving equipment from the UAV; and transmit the one or more directional signals and the release signal to the UAV. In response to receipt of the directional signals, the UAV may be configured to move in the desired direction of travel and, in response to receipt of the release signal, move the equipment engagement mechanism into the open configuration to release the lifesaving equipment.

In various embodiments, the lifesaving equipment may be secured to a control line configured to pull the lifesaving equipment in a direction of safety. The control line may be secured to a take-up reel configured to rotate and thereby pull the control line in the direction of safety. The take-up reel may be a part of a collapsible line control device comprising an elongated line guide configured for directing a length of the control line away from the take-up reel.

In various embodiments, the UAV additionally comprises a camera configured to generate video data; and the UAV is configured to transmit the video data to the control device for display to a user via a graphical display on the control device.

Various embodiments are directed to a method for providing lifesaving equipment to a person in distress. The method comprising steps for piloting an unmanned aerial vehicle (UAV) to the person in distress by causing data indicative of a desired direction of travel to be wirelessly transmitted from a control device to the UAV, wherein the UAV comprises an equipment engagement mechanism configured to releasably secure the lifesaving equipment to the UAV and the equipment engagement mechanism is operable between a closed configuration in which the lifesaving equipment is secured to the UAV and an open configuration in which the lifesaving equipment is released from the UAV; causing transmission, from the control device to the UAV, of a release signal indicating the lifesaving equipment should be released, such that the UAV moves the equipment engagement mechanism into the open configuration to release the lifesaving equipment; and after the lifesaving device is released from the UAV, causing a length of control line secured to the lifesaving device to be recalled in a direction of safety, thereby pulling the lifesaving device in a direction of safety.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments of the present invention are directed to methods and systems for providing lifesaving equipment to a distressed individual. For example, the system may include an Unmanned Aerial Vehicle (UAV) having an engagement mechanism configured to detachably secure a floatation device to be provided to a distressed individual in need of a water rescue. Thus, a rescuer may pilot the UAV via a control device to a location within close proximity of the distressed individual, and then operate the engagement feature via the control device to release the floatation device and thereby provide it to the distressed individual. In various embodiments, the floatation device (e.g., a life preserver) may be connected to a control line such that the rescuer can pull the life preserver to a safe location once the distressed individual grasps the life preserver. Accordingly, the rescuer is able to pull the distressed individual to safety using the control line. Moreover, in various embodiments the control line may be operably secured to a line control device. The line control device may include a take-up reel for storing unneeded excess control line. In various embodiments, the line control device may be integrated into the control device to facilitate operation of both devices by a single operator.

In various embodiments, the UAV, float, line control device, and control device are configured to be stored within a single storage container. The float may be stored such that it is secured to the UAV during storage so as to facilitate rapid deployment of the system upon discovering a person in distress.

Unmanned Aerial Vehicle (UAV)

Figure 1:
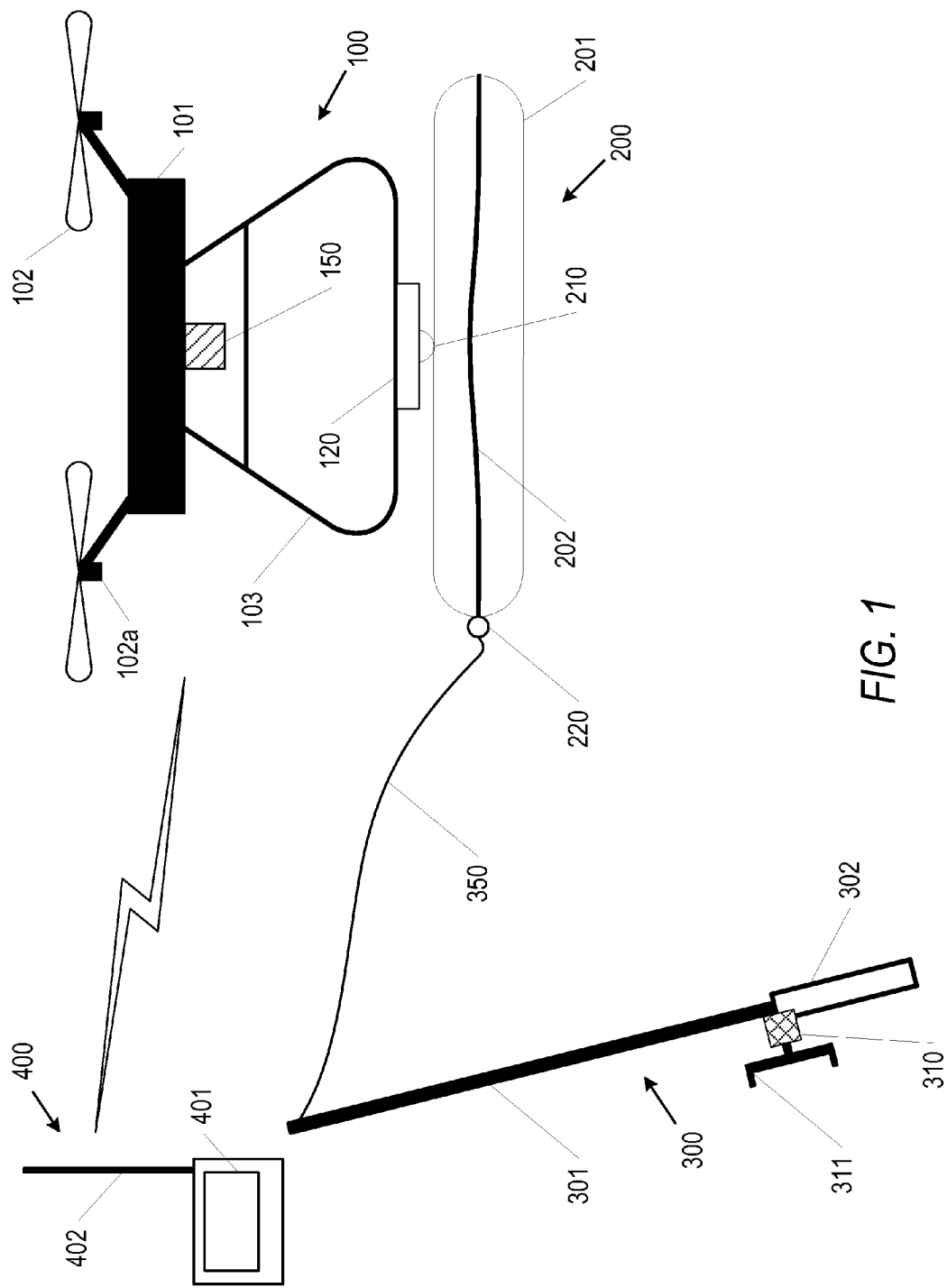
FIG. 1 is a schematic diagram of a system to be used to provide lifesaving equipment to a distressed individual according to an embodiment of the present invention.

In various embodiments, a UAV as described herein may be a powered aircraft configured to be controlled by a user operating a control device in wireless communication with the UAV. As shown in FIG. 1, which is a schematic diagram of a system according to various embodiments, a UAV 100 may comprise a body 101 and one or more lift mechanisms, such as one or more rotors 102 controlled by one or more drive mechanisms 102a (e.g., electric motors, gas engines, and/or the like), as illustrated in FIG. 1. As a non-limiting example, the UAV 100 may comprise four rotors 102 configured to rotate and thereby provide lift to the UAV 100. Although not shown, the UAV 100 may additionally comprise one or more rotor guards configured to impede objects from being introduced into the area of operation of the rotors 100. Referring again to FIG. 1, the UAV 100 may additionally comprise one or more supports 103 configured to support the UAV 100 when not in flight. As a non-limiting example, the one or more supports 103 may comprise solid rods extending away from a bottom surface of the body 101 of the UAV 100. As a non-limiting example, the rods may comprise metal (e.g., aluminum or steel), plastic, and/or composite (e.g., carbon fiber) materials, and may have an at least substantially round cross-section. As illustrated in FIG. 1, the supports 103 may be in the shape of a closed loop having a bottom section extending between two or more substantially vertical portions. Moreover, in various embodiments the UAV 100 may comprise two or more supports 103 extending away from the body 101.

Moreover, as illustrated in FIG. 1, the UAV 100 may comprise an equipment engagement mechanism 120 configured to interact with a corresponding feature of a safety device (e.g., a float). For example, as will be described in greater detail herein, the equipment engagement mechanism 120 may be configured to interact with a mating engagement feature 210 disposed on a float 200, and to thereby detachably secure the float to the UAV 100. Although the equipment engagement mechanism 120 is illustrated in FIG. 1 as being secured to the one or more supports 103, it should be understood that the equipment engagement mechanism 120 may be secured in any of a variety of locations. As additional non-limiting examples, the equipment engagement mechanism 120 may be secured directly to or integrated within the body 101 (e.g., on the bottom surface of the body). Moreover, although the equipment engagement mechanism 120 is illustrated in FIG. 1 as supporting the float in a horizontal configuration, it should be understood that the equipment engagement mechanism 120 may support a float in any of a variety of configurations (e.g., vertical).

In various embodiments, the equipment engagement mechanism 120 may comprise a latch that may be operated remotely via the control device 400. As a non-limiting example, the equipment engagement mechanism 120 may comprise an electronically-actuated solenoid and/or an electronically-controlled servo-motor configured to move between a closed configuration and an open configuration such that the float may be selectively supported and released by the equipment engagement mechanism 120. As will be described in greater detail herein, the equipment engagement mechanism 120 may be in electronic communication with an on-board controller (not shown) of the UAV 100. The equipment engagement mechanism 120 may be configured to receive a control signal from the on-board controller, and thereby move between the open configuration and the closed configuration in response to receipt of the control signal.

Moreover, as illustrated in FIG. 1, the UAV 100 may additionally comprise one or more additional accessories 150. For example, such accessories may comprise a video camera, a still camera, one or more light sources (e.g., Light Emitting Diodes (LEDs)), laser sights, and/or the like. Such accessories may thereby aid a user of the UAV 100 in directing the UAV such that the lifesaving equipment may be provided in close proximity to the distressed individual. In various embodiments, each of the one or more accessories 150 may be in electronic communication with the on-board controller, such that data and/or signals may be transmitted between the on-board controller and the one or more accessories 150. For example, in embodiments in which the accessory is embodied as a video camera, video data generated by the video camera may be transmitted to the on-board computer and to the control device 400 such that the user can review the video data. In still other embodiments, any of a variety of additional or alternative accessories 150 may be provided, as may be desirable, provided such are generally configured to or useful for facilitating a rescue effort.

Figure 3:
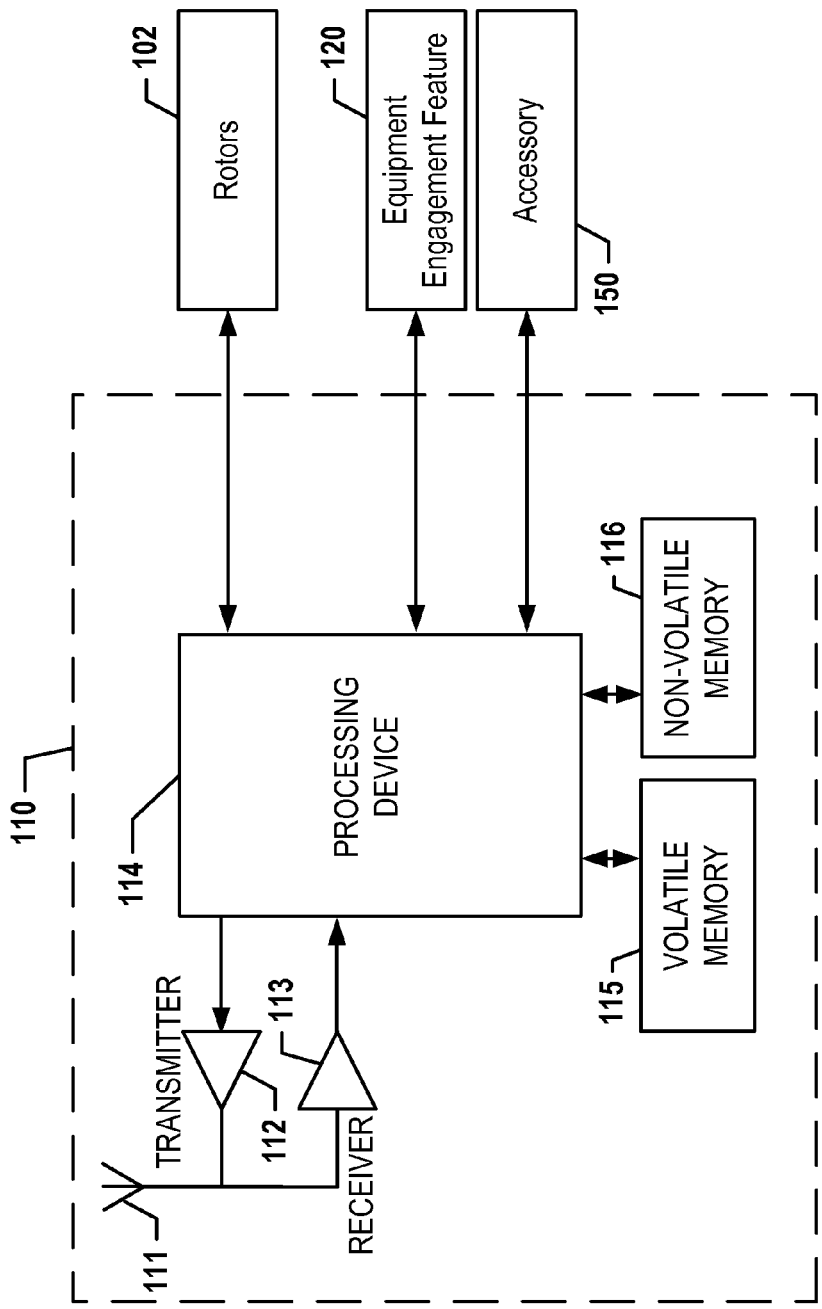
FIG. 3 is a schematic diagram of a UAV on-board controller according to various embodiments of the present invention.

As previously indicated, the UAV 100 may additionally comprise an on-board controller 110 in electronic communication with various components of the UAV 100. A schematic of an example on-board controller 110 is shown in FIG. 3. In various embodiments, the on-board controller 110 may include an antenna 111, a transmitter 112 (e.g., radio), a receiver 113 (e.g., radio), and a processing element 114 that provides signals to and receives signals from the transmitter 112 and receiver 113, respectively.

The signals provided to and received from the transmitter 112 and the receiver 113, respectively, may include signaling data in accordance with an air interface standard of applicable wireless systems to communicate with the control device 400. In this regard, the on-board controller 110 may be capable of operating with one or more air interface standards, communication protocols, modulation types, and access types. More particularly, the on-board controller 110 may operate in accordance with any of a number of wireless communication standards and protocols. In a particular embodiment, the on-board controller 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

According to one embodiment, the on-board controller 110 may include a location determining device and/or functionality. For example, the on-board controller 110 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The on-board controller 110 may also include volatile storage or memory 115 and/or non-volatile storage or memory 116, which can be embedded and/or may be removable. For example, the non-volatile memory may be read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), racetrack memory, and/or the like. The volatile memory may be random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. The volatile and non-volatile storage or memory can store data, applications, programs, program modules, scripts, source code, object code, byte code, compiled code, interpreted code, machine code, executable instructions, and/or the like to implement the functions of the on-board controller 110.

Moreover, as indicated in FIG. 3, the on-board controller 110 may be in electronic communication with the lift mechanism (e.g., rotors 102) and/or one or more steering mechanisms (e.g., rotor tilt systems, rudder, elevators, flaps, stabilizers, and/or the like). In this regard, the on-board controller 110 may be configured to send one or more steering signals to one or more of the lift mechanisms and/or steering mechanisms in order to direct the UAV 100 in a desired direction. In various embodiments, the on-board controller 110 may be configured to provide steering signals to the one or more lift mechanisms and/or steering mechanisms in response to receipt of a corresponding signal from the control device 400. As will be described in greater detail herein, the signal received from the control device 400 may be generated in response to a user input received by the control device 400. As will be described in greater detail below, the on-board controller 110 may be configured to send corresponding steering signals to the one or more lift mechanisms and/or steering mechanisms such that the UAV 400 is caused to hover in one place when no steering user input is received.

As previously indicated, the on-board controller 110 may be in electronic communication with the equipment engagement mechanism 120 and/or one or more accessories 150. In various embodiments, the on-board controller 110 may communicate with the equipment engagement mechanism 120 and/or the one or more accessories 150 via wired and/or wireless communication protocols. For example, the on-board controller 110 may be configured to send a signal via a wired communication protocol to the equipment engagement mechanism 120 to move an associated solenoid into the open position to drop the lifesaving device (e.g., a float). In various embodiments, the on-board controller 110 may be configured to receive a signal from the control device 400, and send a corresponding signal to the equipment engagement mechanism 120 indicating that the equipment engagement feature should be moved to the open configuration. As will be described in greater detail herein, the signal received from the control device 400 may be generated in response to a user input to the control device 400 indicating that the equipment engagement mechanism 120 should be moved between the closed configuration and the open configuration.

As yet another non-limiting example, the on-board controller 110 may be configured to transmit a signal to an accessory 150, such as a light source and/or a laser sight to activate and/or deactivate the same. Moreover, in various embodiments the on-board controller 110 may be configured to transmit and/or receive one or more signals from other wireless communication devices via one or more wireless communication protocols. As a non-limiting example, the on-board controller 110 may be configured to transmit and/or receive one or more signals from a cellular telephone or other handheld mobile device. Accordingly, the on-board controller 110 may be configured to receive directional signals from a mobile device, and/or may transmit one or more alerts to various handheld mobile devices. For example, upon the occurrence of a trigger event (such as the activation of the UAV 100, the activation of an accessory 150, the release of a safety device (e.g., float 200), and/or the like), the on-board controller 110 may be configured to transmit an alert to emergency personnel informing the emergency personnel of the occurrence of the trigger event. In various embodiments, the transmitted alert may additionally comprise information regarding the location of the UAV 100. As yet another non-limiting example, the on-board controller 110 may be configured to transmit signals received from an accessory (e.g., video signals received from an on-board camera) to one or more mobile devices. In various embodiments, the on-board controller 110 may be configured to transmit and/or receive signals from a plurality of wireless devices simultaneously and/or consecutively.

Accordingly, the on-board controller 110 may be configured to transmit and/or receive signals from a plurality of sources.

Float

Referring again to FIG. 1, the UAV 100 may be configured to support a float 200 and provide the float to a distressed person. In various embodiments, the float 200 may be embodied as a floating ring comprising a circular, buoyant float body 201 with a concentric hole extending therethrough. As additional non-limiting examples, the float body 201 may comprise a buoyant lifeguard rescue can, a buoyant lifeguard rescue tube, and/or the like. In various embodiments the float body 201 may comprise a foam material. As an additional non-limiting example, the float body 201 may comprise an inflatable float body configured to be filled with air or another gas. Moreover, in various embodiments, the float 200 may comprise a grip feature, such as a rope 202 extending around the perimeter of the float 200.

Moreover, as illustrated in FIG. 1, the float may additionally comprise one or more mating engagement features 210 such as one or more rings, configured to interact with the equipment engagement mechanism 120 of the UAV 100. For example, the one or more mating engagement features 210 may comprise one or more rings (e.g., metal, plastic, or composite rings), loops (e.g., rope loops fabric loops, and/or the like), engagement members (e.g., horizontal bars integrated into the surface of the float 200), and/or the like. As described herein, the one or more mating engagement features 210 are configured to interact with the equipment engagement mechanism 120 such that the float 200 may be selectively released from the UAV 100 by moving the equipment engagement mechanism 120 into the open configuration.

In various embodiments, the float 200 may not comprise the one or more mating engagement features 210, and instead the equipment engagement mechanism 120 may be configured to engage one or more components of the float 200. As non-limiting examples, the equipment engagement mechanism 120 may be configured to grasp the float body 201 and/or the grip feature (e.g., rope 202).

Referring again to FIG. 1, the float 200 may additionally comprise a line engagement feature 220 configured to secure the float 200 to a control line 350. For example, the line engagement features 220 may comprise a ring (e.g., a metal ring, a plastic ring, and/or a composite ring), a loop (e.g., a rope loop and/or a fabric loop), an engagement bar (e.g., a horizontal bar integrated into the surface of the float 200), and/or the like. However, in various embodiments the float may not comprise the one or more line engagement features 220. As non-limiting examples, the float 200 may be secured to the control line 350 by securing the line directly to the float body 201 (e.g., by tying the line around a portion of the float body).

Line Control Device

Referring again to FIG. 1, various embodiments comprise a line control device 300 secured to the float 200 via a control line 350. As illustrated in FIG. 1, the line control device 300 may comprise a line guide 301 and a handle 302. In various embodiments, the line guide 301 may comprise an elongated rigid or semi-rigid rod. In various embodiments, the line guide 301 may comprise one or more guide rings (not shown) configured to guide the control line 350 from a bottom portion of the line guide 301 to a top portion of the line guide 301. The control line 350 may be loosely threaded through each of these control rings such that the control line 350 may slide relative to the control rings. In various embodiments, the handle 302 may be disposed adjacent the bottom portion of the line guide 301. Accordingly, by guiding the control line 350 to a top portion of the line guide 301 before extending away to the float 200, the line guide 301 provides additional control to the user of the line control device 300 while recalling a length of the control line 350. For example, the user of the line control device 300 may utilize the additional length of the line guide 301 in guiding a length of control line 350 over or under an obstacle (e.g., a tree limb) positioned between the user and the float 200.

In various embodiments, the line control device 350 may be collapsible and/or extendable. As a non-limiting example, the line guide 350 may comprise a plurality of nested (e.g., concentric) frustoconical segments configured to slide relative to one another between an extended configuration in which each of the segments are engaged with one another to form an elongated line guide 301, and a collapsed configuration in which at least one of a top edge and/or a bottom edge of each of the plurality of segments are substantially aligned, respectively. For example, in the collapsed configuration, each of the plurality of segments of the line guide 301 may be located within the handle 302.

Moreover, as shown in FIG. 1, the line control device 300 may additionally comprise a take-up reel 310 and associated handle 311 configured to provide storage for the unused portion of control line 350. For example, the take-up reel 310 may be configured to support any control line 350 beyond the amount necessary to extend a section of the control line 350 between the user of the line control device 300 and the location of the float 200 (e.g., attached to the UAV 100 or proximate a distressed individual). Moreover, the take-up reel 310 may be configured to recall a length of control line 350 by rotating the take-up reel 310 to pull the control line 350 toward the take-up reel and wind a length of the control line 350 onto the take-up reel 310. In various embodiments, the take-up reel 310 may be rotated by the handle 311. Accordingly, by rotating the take-up reel 310 so as to recall a length of control line 350 to be wound onto the take-up reel, the float 200 may be pulled toward the line control device 300 being controlled by a user. Thus, a distressed individual grasping the float 200 may be pulled to safety when a length of the control line 350 is recalled.

In various embodiments, the control line 350 may be configured to withstand the force of a distressed individual being pulled through water. Thus, the control line 350 may be configured to withstand strains on the control line caused by drag forces associated with pulling the float 200 and a distressed individual through water. Moreover, the control line 350 may be configured to withstand high impulse forces that may be imparted on the control line 350 by tides, currents, tree limbs, grasses, rocks, and other natural and man-made environmental conditions and/or features that may interact with the control line 350, the float 200, and/or a distressed individual while the components are being pulled toward the line control device 300. In various embodiments, the control line 350 may comprise rope, string, fishing line, and/or the like.

Although the illustrated embodiment comprises a line control device 300, various embodiments comprise a control line 350 unconnected to a line control device 300. Accordingly, in such embodiments, a user may recall a length of the control line 350 by pulling the control line 350 toward the user.

Control Device

As illustrated in FIG. 1, various embodiments comprise a control device 400 in wireless communication with the UAV 100 (e.g., the on-board controller 110). In various embodiments, various features of the control device 400 are similar to those described in reference to the on-board controller 110 of the UAV 100. For example, the control device 400 may include an antenna 402, a transmitter (e.g., radio), a receiver (e.g., radio), and a processing element that provides signals to and receives signals from the transmitter and receiver, respectively.

The signals provided to and received from the transmitter and the receiver, respectively, may include signaling data in accordance with an air interface standard of applicable wireless systems to communicate with the UAV 110. In this regard, the control device 400 may be capable of operating with one or more air interface standards, communication protocols, modulation types, and access types. More particularly, the control device 400 may operate in accordance with any of a number of wireless communication standards and protocols. In a particular embodiment, the control device 400 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

The control device 400 may also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store data, applications, programs, program modules, scripts, source code, object code, byte code, compiled code, interpreted code, machine code, executable instructions, and/or the like to implement the functions of the control device 400.

Moreover, the control device 400 may additionally comprise a user interface 401 comprising one or more levers, joy-sticks, directional pads, buttons, switches, and/or the like. In various embodiments, the user interface 401 comprises a touch-screen display (e.g., a capacitive touch-sensitive screen). In various embodiments, the user interface 401 is configured to receive user input indicative of a desired action for the UAV 100. For example, the user interface 401 may be configured to receive input regarding a desired direction of movement for the UAV 100 (e.g., pitch, yaw, and/or roll) such that the user of the UAV 100 may direct the UAV to a desired location via the control device 400. Moreover, the user interface 401 may additionally be configured to receive user input regarding desired actions of the one or more accessories 150 (e.g., camera, light source, sight, and/or the like), and/or the equipment engagement mechanism 120. For example, the user interface 401 is configured to receive user input regarding a desired movement of the equipment engagement mechanism 120 between a closed configuration and an open configuration.

Moreover, in various embodiments the user interface 401 may comprise one or more graphical displays configured to graphically display data received from the UAV 100. For example, output data from a video camera attached to the UAV 100 as an accessory 150 may be transmitted from the on-board controller 110 to the control device 400 and displayed via a graphical display.

Moreover, in various embodiments, the control device 400 may be configured to transmit and/or receive signals from one or more wireless devices (e.g., cellular telephones) via one or more wireless communication protocols. For example, the control device 400 may be configured to transmit signals received from the on-board controller 110, such as the location of the UAV 100, and/or signals received from one or more accessories 150 to a wireless device. Moreover, in various embodiments the control device 400 may be configured to receive direction signals from one or more wireless devices, and relay the directional signals to the on-board controller 110 to control the UAV 100.

Exemplary Method of Providing Equipment to a Person in Distress

Figure 2:
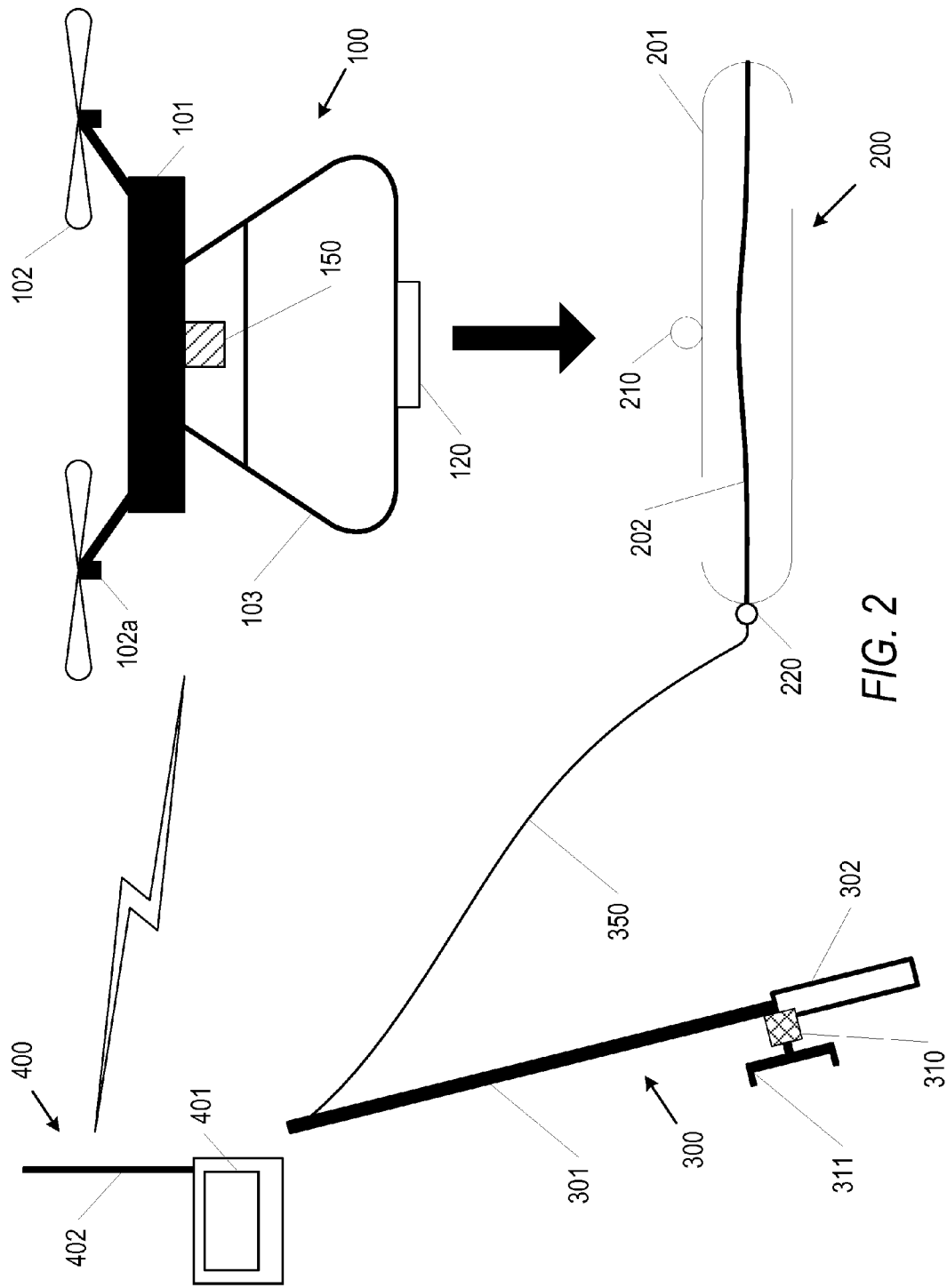
FIG. 2 is a schematic diagram of a system to be used to provide lifesaving equipment to a distress individual after the lifesaving equipment has been released according to an embodiment of the present invention.

FIGS. 1 and 2 are schematic diagrams illustrating lifesaving equipment (e.g., a float 200) before and after release from the UAV. In reference now to FIG. 1, after determining that a person is in distress (e.g., in a deep water hazard), the method may begin by activating the UAV 100 and the control device 400. In embodiments having a collapsible line control device 300, the line guide 301 may be extended into the extended configuration.

The UAV 100 having the lifesaving equipment (e.g., float 200) attached thereto is directed to the person in distress. The UAV 100 is directed to the person in distress in response to signals received from the control device 400, which may be generated based on user input to the user interface 401 of the control device. Accordingly, a user of the system may provide steering input to the user interface 401 of the control device 400, which in response transmits signals indicative of the user input to the UAV 100 (e.g., to the on-board controller 110). The UAV 100 may, in response to the receipt of the signals from the control device 400, provide signals to the one or more lift mechanisms and/or steering mechanisms in order to direct the UAV 100 in a desired direction.

Moreover, while the UAV 100 is receiving signals from the control device 400, the UAV (e.g., on-board controller 110) may receive signals and/or data from one or more accessories 150 secured to the UAV 100. For example, the on-board controller 110 may receive video data from a video camera secured to the UAV 100. The UAV 100 may transmit the data and/or signals received from the one or more accessories to the control device 400 to be displayed via a graphical display. For example, video data received from the video camera is transmitted to the control device 400 for display via a graphical display. Such displayed video data may facilitate guidance of the UAV 100 to a desired location by a user.

As the UAV 100 is moving away from the user and the line control device 300, the control line 350 remains attached to the lifesaving equipment (e.g., float 200) and the line control device 350, and accordingly the length of extended control line 350 increases as the UAV 100 moves away from the user.

Once the UAV 100 is positioned at a desired position (e.g., proximate the person in distress), the lifesaving equipment may be released from the UAV 100 as shown in FIG. 2. For example, the lifesaving equipment may be released from the UAV 100 in response to a signal transmitted from the on-board controller 110 to the equipment engagement mechanism 120 indicating that the equipment engagement feature should move to the open configuration, thereby releasing the lifesaving equipment. Furthermore, the on-board controller 110 may provide the signal to the equipment engagement mechanism 120 in response to the receipt of a corresponding signal received from the control device 400. Accordingly, the control device 400 may receive user input indicating that the lifesaving equipment should be released. In response, the control device 400 generates a corresponding signal, and transmits the signal to the UAV 100 (e.g., on-board controller 110). The on-board controller 110 may then generate and transmit a signal to the equipment engagement mechanism 120 to release the lifesaving equipment.

For example, once a user of the system pilots the UAV 100 to a position proximate the person in distress, the user may provide an input to the control device 400 to release a float 200 to the person in distress. In response, the UAV 100 may release the float 200 such that the person in distress may grasp the float 200.

After the lifesaving equipment is provided to the person in distress, and the person grasps the lifesaving equipment, the control line 350 may be recalled (e.g., via the take-up reel 310), thereby pulling the distressed person toward the system user. For example, if the user operating the system is located at a safe location, such as on dry land adjacent a water hazard, the person in distress is pulled toward the safe area.

By providing lifesaving equipment to a person in distress utilizing a UAV, no additional rescuers must be placed at risk of harm while performing a rescue operation of the distressed person. Moreover, the lifesaving equipment may be provided to the person in distress with a high level of precision, because the equipment is released while the UAV is proximate the person in distress. Thus, in contrast to existing systems in which a float may be thrown to a person in distress from a great distance, the use of a UAV to provide the lifesaving equipment to a person in distress may minimize the effect of environmental forces such as wind, precipitation, and/or the like, which may operate as obstacles to providing lifesaving equipment to a person in distress. As yet another benefit, lifesaving equipment may be provided to distressed persons located a great distance away from rescuers. Thus, in instances in which a potential rescuer may become exhausted before reaching the person in distress, or in instances in which a float cannot be thrown to the person in distress, the UAV may provide the lifesaving equipment to the person in distress without placing additional persons in danger.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

For example, each of the equipment engagement mechanism 120 and/or one or more accessories 150 may individually comprise one or more antennae, transmitters, and/or receivers similar to those described above in reference to the on-board controller 110 of the UAV 100 configured to wirelessly communicate directly with the control device 400. In such configurations, the wireless communication link established between the control device 400 and the equipment engagement mechanism 120 and/or the one or more accessories 150 may operate on a different frequency than the wireless communication link between the control device 400 and the on-board controller 110 such that the communication between the on-board controller 110 and the control device 400 may be maintained simultaneously with the communication between the equipment engagement mechanism 120 and/or the one or more accessories 150 and the control device 400.

Moreover, in various embodiments, the safety device may comprise any of a variety of other devices. Although a float 200 is described herein in the example method of use, other safety devices, such as food stuffs, rope, and/or the like may be provided to a distressed individual via the UAV 100. Accordingly, the described UAV 100 and method of using the same may be utilized in land-based rescue operations in addition to the described water-based rescue operations. For example, a rope may be provided to a distressed individual trapped in quick-sand, and/or food stuffs may be provided to a person trapped in a difficult to access location (e.g., the top of a tower or building, a remote island, and/or the like).

That which is claimed:

1. An integrated mobile system for providing lifesaving equipment to a person in distress, the system comprising:
   an unmanned aerial vehicle (UAV) in wireless communication with a control device and comprising an equipment engagement mechanism configured to releasably secure the lifesaving equipment to the UAV;
   an independent line control device positioned remotely from and physically unattached to the UAV; and
   a control line having a first end, a second end, and a length continuously extending between the first and second ends, the first end being permanently secured to the line control device, the second end being permanently secured to the lifesaving equipment, and the length being unrestrained between the first end and the second end such that no portion of the control line physically contacts the UAV,
   wherein:
      the equipment engagement mechanism is operable between a closed configuration in which the lifesaving equipment is secured to the UAV and an open configuration in which the lifesaving equipment is released from the UAV;
      the control device is configured to:
         generate one or more directional signals in response to user input indicating a desired direction for the UAV, wherein the directional signals are indicative of a desired direction of travel for the UAV;
         generate a release signal in response to user input indicating a request to release the lifesaving equipment from the UAV; and
         transmit the one or more directional signals and the release signal to the UAV; and
      the UAV is configured to:
         in response to receipt of the directional signals, move in the desired direction of travel, and
         in response to receipt of the release signal, move the equipment engagement mechanism into the open configuration to release the lifesaving equipment, wherein upon release, the lifesaving equipment remains secured to only the line control device via the second end of the control line.

2. The system of claim 1, wherein the lifesaving equipment comprises a float.

3. The system of claim 1, wherein the equipment engagement mechanism comprises an electronically actuated latch operable between the closed configuration and the open configuration.

4. The system of claim 3, wherein the lifesaving equipment comprises a mating engagement feature configured to interact with the electronically actuated latch when in the closed configuration to releasably secure the lifesaving equipment to the UAV.

5. The system of claim 1, wherein the control line configured to pull the lifesaving equipment in a direction of safety.

6. The system of claim 5, wherein:
the line control device comprises a take-up reel configured to rotate, and
the control line is secured to the take-up reel so as to thereby pull the control line such that the control line is wound onto the take-up reel.

7. The system of claim 6, wherein the line control device further comprises:
an elongated line guide having a first end and a second end, comprising at least one guide feature proximate the first end for directing a length of the control line away from the take-up reel and toward the first end; and
wherein the take-up reel is secured to the line control device proximate the second end of the elongated line guide.

8. The system of claim 7, wherein the elongated line guide is collapsible.

9. The system of claim 1, wherein the control device further comprises a handheld device comprising:
one or more processors configured to:
receive user input indicative of the desired direction of travel;
receive user input indicating the lifesaving device should be released;
generate, based at least in part on the user input indicative of the desired direction of travel, the one or more directional signals;
generate, based at least in part on the user input indicating the lifesaving device should be released, the release signal; and
transmit the one or more directional signals and the release signal to the UAV.

10. The system of claim 9, wherein:
the UAV additionally comprises a camera configured to generate video data; and
the UAV is additionally configured to transmit the video data to the control device;
wherein the control device additionally comprises a graphical display, and the one or more processors are additionally configured to display, via the graphical display, the video data generated by the camera.

11. An integrated mobile method for providing lifesaving equipment to a person in distress, the method comprising steps for:
piloting an unmanned aerial vehicle (UAV) to the person in distress by causing data indicative of a desired direction of travel to be wirelessly transmitted from a control device to the UAV, wherein the UAV comprises an equipment engagement mechanism configured to releasably secure the lifesaving equipment to the UAV and the equipment engagement mechanism is operable between a closed configuration in which the lifesaving equipment is secured to the UAV and an open configuration in which the lifesaving equipment is released from the UAV;
causing transmission, from the control device to the UAV, of a release signal indicating the lifesaving equipment should be released from the UAV, such that the UAV moves the equipment engagement mechanism into the open configuration that is configured to release the lifesaving equipment, the release signal having been generated in response to user input indicating a request to release the lifesaving equipment from the UAV; and
after the lifesaving device is released from the UAV, causing a length of control line to be recalled in a direction of safety, thereby pulling the lifesaving device in the direction of safety, wherein:
the control line has a first end, a second end, and a length continuously extending between the first and second ends,
the first end is permanently secured to the line control device,
the second end is permanently secured to the lifesaving equipment, and
the length of the control line is unrestrained between the first end and the second end such that no portion of the control line physically contacts the UAV in both the closed configuration and the open configuration.

12. The method of claim 11, wherein the lifesaving device comprises a float.

13. The method of claim 11, wherein the equipment engagement mechanism comprises an electronically actuated latch operable between the closed configuration and the open configuration, and wherein said step of causing transmission of the release signal comprises causing transmission of a signal configured to cause the electronically actuated latch to move to the open configuration.

14. The method of claim 11, wherein causing the length of control line to be recalled in a direction of safety comprises causing the length of control line to be wound onto a take-up reel.

* * * * *